Dec. 20, 1932.   L. H. KIRKPATRICK   1,891,424
GASKET
Filed March 11, 1929   2 Sheets-Sheet 2
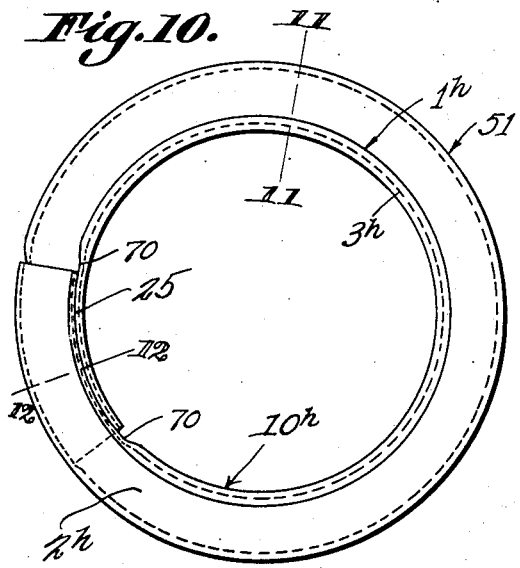
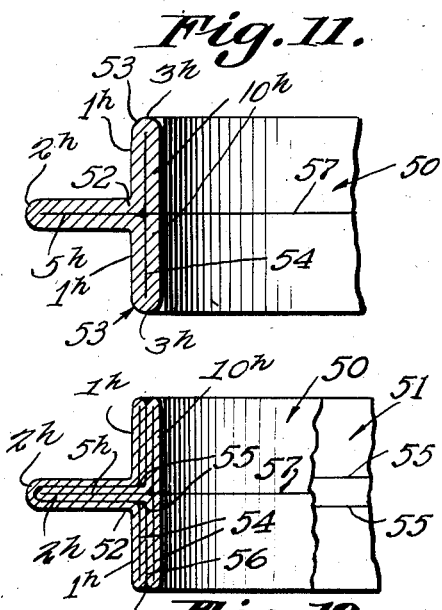
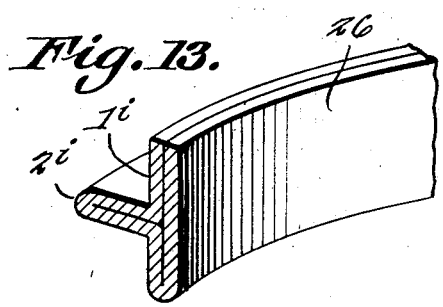
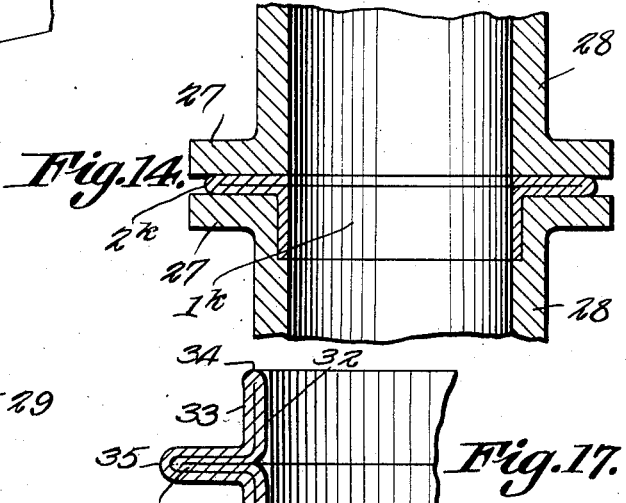
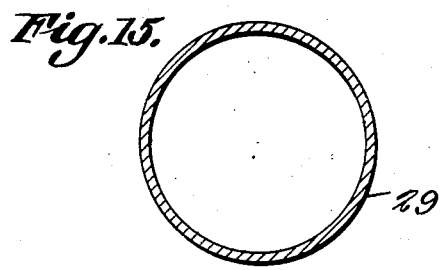
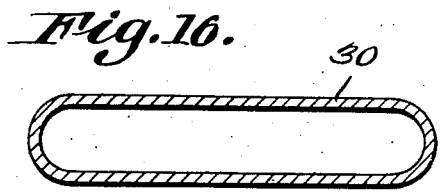
L. H. Kirkpatrick
Inventor
By C. A. Snow & Co.
Attorneys.

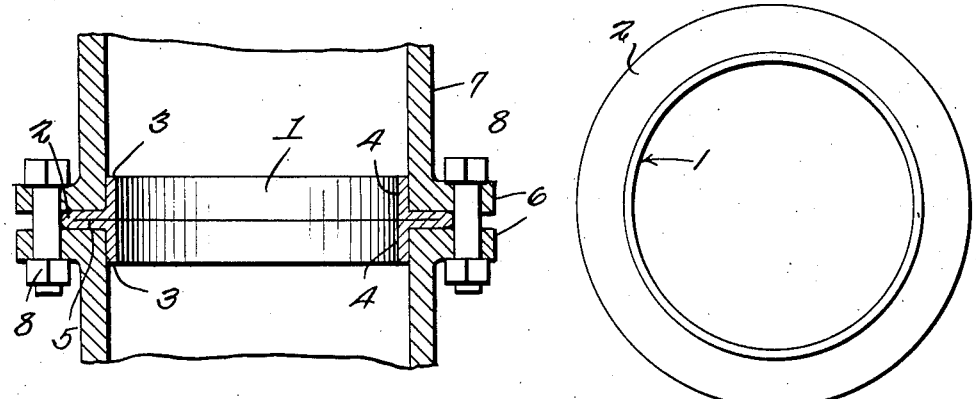
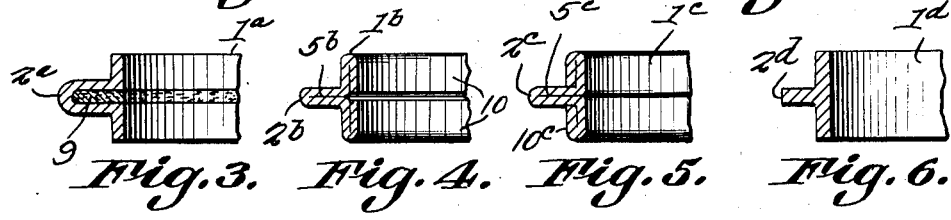
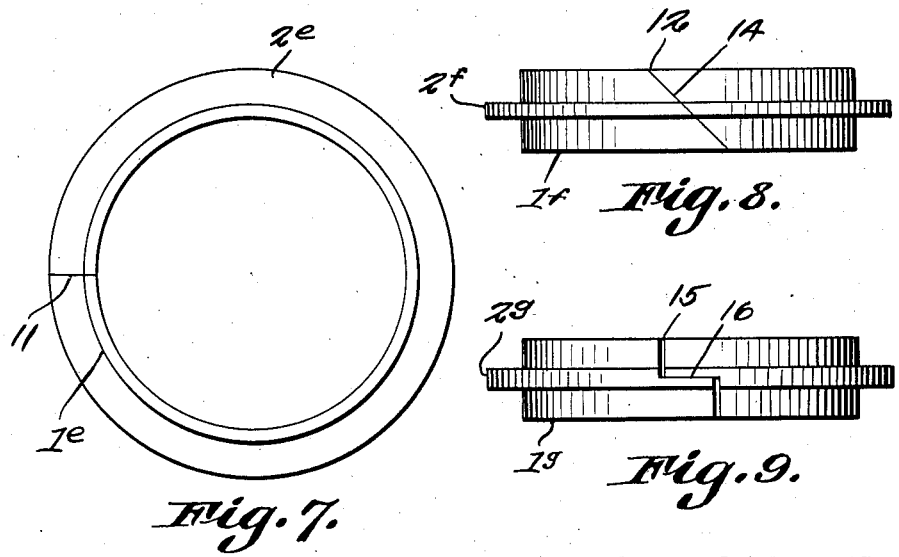

Patented Dec. 20, 1932

1,891,424

UNITED STATES PATENT OFFICE

LIGE H. KIRKPATRICK, OF LAWTON, OKLAHOMA, ASSIGNOR OF ONE-HALF TO A. G. SECHRIST, OF LAWTON, OKLAHOMA

GASKET

Application filed March 11, 1929. Serial No. 346,207.

This invention aims to provide a gasket which can be manufactured cheaply because it is made in one piece, the gasket being of great strength, and being so constructed that there will be little if any chance of leakage.

It is within the province of the disclosure to improve generally and to enhance the utility of a device of that kind to which the invention appertains.

A preferred form of the invention has been shown, but it will be understood that a mechanic, working within the scope of what is claimed, may make such changes as his skill may suggest, without departing from the spirit of the invention.

In the accompanying drawings:—

Figure 1 shows in transverse section, a device constructed in accordance with the invention, mounted between the ends of a pair of pipe sections;

Figure 2 is a plan of the gasket;

Figures 3, 4, 5, and 6 are sections showing modifications;

Figure 7 is a plan showing a further modification;

Figures 8 and 9 are elevations showing still other modifications;

Figure 10 is a plan showing a modification;

Figure 11 is a cross-section on the line 11—11 of Figure 10;

Figure 12 is a cross-section on the line 12—12 of Figure 10;

Figure 13 is a perspective view showing a modification, parts being broken away;

Figure 14 is a sectional view disclosing a modification;

Figure 15 is a section showing the tube out of which is formed the gasket depicted in Figure 17;

Figure 16 is a section showing the tube of Figure 15 partially flattened, prior to forming it into the gasket of Figure 17;

Figure 17 is a section of the gasket that is made out of the tube shown in Figures 15 and 16.

Referring to Figures 1 and 2, there is shown a gasket comprising an annular body 1 and a flange 2 outstanding from the body, the flange being spaced from the edges 3 of the body, the flange 2 being U-shaped in cross-section, and being extended in opposite directions, as shown at 4, to form the body 1. In Figure 1 of the drawings, the side walls of the flange 2 are closed tightly together, as shown at 5.

The gasket may be used for many purposes, one of which is shown in Figure 1. In that figure, the part 2 of the gasket is received between the flanges 6 of a pair of pipes 7, the flanges 6 being drawn together on the part 2 of the gasket by bolts 8, the body 1 of the gasket being disposed within the ends of the pipe section 7.

In Figure 3 of the drawings, parts hereinbefore described have been designated by numerals previously used, with the suffix $a$. In Figure 3 the flange $2a$ is not closed together, as at 5 in Figure 1, the side walls of the flange $2a$, in Figure 3, being spaced apart to form a recess in which a yieldable packing 9 is disposed.

In Figure 4 of the drawings, parts hereinbefore described have been designated by numerals previously used, with the suffix $b$. In this form of the invention, the body $1b$ is provided at its edges with annular wings 10 which extend inwardly toward each other, the wings 10 being located within the body $1b$.

In Figure 5 of the drawings, parts hereinbefore described have been designated by numerals previously used, with the suffix $c$. In this form of the invention, the body is provided at its edges with annular wings $10c$ which extend inwardly toward each other, the wings $10c$ being located without the body $1c$ and having their edges in engagement with the flange $2c$.

In Figure 2 of the drawings, the gasket is continuous, but in Figure 7, the gasket has been shown as divided transversely at one place, as shown at 11. In Figure 7 of the drawings, parts hereinbefore described have been designated by numerals previously used, with the suffix $e$.

In Figure 8 of the drawings, parts hereinbefore described have been designated by numerals previously used, with the suffix $f$. The gasket is divided at 12, the ends of the gasket being overlapped on a bevel, as shown at 14.

In Figure 9, parts hereinbefore described have been designated by numerals previously used, with suffix *g*. The gasket is divided transversely, as shown at 15, the ends of the gasket being halved together and overlapped, as shown at 16.

The simplest form of the invention is disclosed in Figure 6. In that figure, parts hereinbefore described have been designated by numerals previously used, with suffix *d*. Here the gasket is shown solid, and not of the folded construction depicted in Figures 3, 1, 4, 5, and 6.

It will be understood that any of the gaskets shown in Figures 1, 3, 4, 5, or 6, may be made continuous, as in Figure 2, or they may be divided as shown in Figures 7, 8, and 9.

Any suitable material may be used in the making of the gasket, such as copper, aluminum, brass, any alloy, fiber, etc., it being understood that the specific mentioning of these materials does not prevent the using of any other suitable material. It is suggested that the compressible packing 9 of Figure 2 ought to be made out of refractory material, and asbestos, or an asbestos compound, may be employed to advantage in the making of the packing.

The gaskets shown in the drawings are simple, inexpensive to manufacture, and thoroughly effective for the ends in view.

In the form disclosed in Figs. 10, 11 and 12, there is shown a packing made up of an inner gasket 50 and an outer gasket 51. Each of the gaskets 50 and 51 is of one piece construction. Each of the gaskets comprises a U-shaped, outstanding flange 2*h*, provided at its inner edges 52 with oppositely-projecting walls 1*h*, disposed at right angles to the flange, the walls being formed, as indicated at 3*h*, at their remote edges 53, into wings 10*h*, which overlap the inner surfaces of the walls 1*h*, and are in contact therewith, as indicated at 54. The flange of the inner gasket 50 is closed tightly together, as at 5*h*, and fits closely within the flange of the outer gasket 51, as shown in Fig. 12, the adjacent edges 55 of the wings of the outer gasket 51 being spaced apart, but being in engagement with the flange of the inner gasket 50. The walls of the inner gasket 50 are in contact, as shown at 56, with the wings of the outer gasket 51, and the free edges of the wings of the inner gasket 50 are in contact with each other, as marked by the numeral 57. The ends 25 of each gasket are overlapped, as shown at 25 in Fig. 10. The flange 2*h* on one end of each gasket is opened to receive the other end of the same flange closely but slidably, the construction being such that the gasket may be expanded or contracted in diameter, as occasion may require. In order that the gasket may not be too bulky where it is overlapped, the ends of the gasket are thinned at 70, as Figure 10 will show.

In Figure 13, parts hereinbefore described have been designated by numerals previously used, with the suffix *i*. Figure 13 shows that the body 1*i* may be supplied on either edge with a wing 26 which extends entirely across the body, instead of half way across the body like the wing 10*h* of Figure 11.

In Figure 14, parts hereinbefore described have been designated by numerals previously used, with the suffix *k*. In this form of the invention, the flange 2*k* is double-walled and is located at one edge of the body 1*k*. The flange 2*k* is shown as bound between the flanges 27 of a pair of pipe sections 28.

In Figure 17, there is shown a one-piece gasket comprising a body 31 including an inner wall 32 and an outer wall 33, the walls 32 and 33 being joined integrally at their edges, as shown at 34. The outer wall 33 is provided intermediate its said edges 34 with a laterally extended, integral, U-shaped flange 35. The inner wall 32 is provided intermediate the aforesaid edges 34 with a laterally extended, integral, U-shaped flange 36 received within the flange 35 of the outer wall 33. The gasket shown in Figure 17 is made out of a metal tube 29, which is partially flattened, as shown at 30 in Figure 16, prior to being bent to make the gasket disclosed in Figure 17.

What is claimed is:—

A packing made up of outer and inner gaskets, each of one-piece construction, each gasket comprising a U-shaped outstanding flange provided at its inner edges with oppositely projecting walls disposed at right angles to the flange, the walls being formed at their remote edges into wings which overlap the inner surfaces of the walls, and are in contact therewith, the flange of the inner gasket being closed tightly together and fitting closely within the flange of the outer gasket, the adjacent edges of the wings of the outer gasket being spaced apart, but being in engagement with the flange of the inner gasket, the walls of the inner gasket being in contact with the wings of the outer gasket, and the free edges of the wings of the inner gasket being in contact with each other.

In testimony that I claim the foregoing as my own, I have hereto affixed my signature.

LIGE H. KIRKPATRICK.